United States Patent
Mitchell et al.

(10) Patent No.: US 7,571,466 B2
(45) Date of Patent: Aug. 4, 2009

(54) PARENTAL CONSENT SERVICE

(75) Inventors: Christopher E. Mitchell, Redmond, WA (US); Sylvia K. Mollerstrom, Seattle, WA (US); Jonathan P. Horton, Woodinville, WA (US); Wei-Quiang Michael Guo, Bellevue, WA (US); Steven M. Cellini, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 09/792,170

(22) Filed: Feb. 23, 2001

(65) Prior Publication Data

US 2002/0120866 A1 Aug. 29, 2002

(51) Int. Cl.
*H04L 9/32* (2006.01)
*H04L 29/06* (2006.01)
*G06F 21/00* (2006.01)
*H04N 7/167* (2006.01)
*H04L 9/00* (2006.01)

(52) U.S. Cl. .................. 726/4; 726/5; 726/6; 713/165; 713/166; 713/168; 713/182; 380/231; 380/232; 705/51; 705/52; 705/59

(58) Field of Classification Search ............... 713/201, 713/200
See application file for complete search history.

(56) References Cited

U.S. PATENT DOCUMENTS

| | | | | |
|---|---|---|---|---|
| 5,526,035 A * | 6/1996 | Lappington et al. | ......... | 725/136 |
| 5,758,258 A * | 5/1998 | Shoff et al. | ................. | 725/116 |
| 5,845,260 A * | 12/1998 | Nakano et al. | ................ | 705/26 |
| 6,163,272 A * | 12/2000 | Goode et al. | ................. | 725/30 |
| 6,352,475 B1 * | 3/2002 | Mraovic | ........................ | 463/9 |
| 6,574,798 B1 * | 6/2003 | Bradley et al. | ............... | 725/153 |
| 6,651,047 B1 * | 11/2003 | Weschler, Jr. | .................. | 707/1 |
| 6,671,682 B1 * | 12/2003 | Nolte et al. | ..................... | 707/5 |
| 6,704,787 B1 * | 3/2004 | Umbreit | ..................... | 709/229 |
| 6,745,367 B1 * | 6/2004 | Bates et al. | ................. | 715/205 |
| 6,769,127 B1 * | 7/2004 | Bonomi et al. | ................. | 725/39 |
| 6,785,901 B1 * | 8/2004 | Horiwitz et al. | ............... | 725/25 |
| 2002/0049806 A1 * | 4/2002 | Gatz et al. | .................. | 709/203 |
| 2002/0057298 A1 * | 5/2002 | Wassom et al. | ............. | 345/825 |
| 2006/0173793 A1 * | 8/2006 | Glass | .......................... | 705/75 |
| 2006/0259778 A1 * | 11/2006 | Gudorf et al. | ............... | 713/186 |

(Continued)

OTHER PUBLICATIONS

Frisone, Deborah, Privacy: Is Big Browser Watching? Privacy in the Internet Age, 2000, Commercial Law Bulletin, pp. 8-10.*

(Continued)

*Primary Examiner*—Ayaz R Sheikh
*Assistant Examiner*—Aravind K Moorthy
(74) *Attorney, Agent, or Firm*—Birch, Stewart, Kolasch and Birch, LLP

(57) ABSTRACT

A user profile having consent information regarding a network server for a second party is created. Such consent information is received from a first party and stored in the user profile of the second party. The second party may access the network server if the consent information stored in the user profile of the second party shows that the first party has provided consent. The second party may not access the network server if the consent information stored in the user profile of the second party shows that the first party has denied consent.

23 Claims, 5 Drawing Sheets

U.S. PATENT DOCUMENTS

2007/0061459 A1* 3/2007 Culbreth et al. ............. 709/225
2008/0222271 A1* 9/2008 Spires ........................ 709/218

OTHER PUBLICATIONS

McAfee, Alice, Creating Kid-Friendly Webspace: A Playground Model for Internet Regulation, 2003, Texas Law Review, pp. 201-225.*

Cai, X., et al., "Online privacy issues associated with web sites for children," *J. Broadcasting & Electronic Media*, 2000, ISSN 0883-8151, 197-214.

Retsky, M.L., "Sites find COPPA compliance mandatory," *Marketing and the Law*, Aug. 28, 2000, 10-11.

Snell, R., "Web-based device monitoring and control," *Embedded Systems Conference*, Spring 1999, 283-295.

* cited by examiner

PARENTAL CONSENT SERVICE

TECHNICAL FIELD

The present invention relates to granting access to a network server. In particular, the present invention relates to a method and system for obtaining and modifying parental consent to access a network server.

BACKGROUND OF THE INVENTION

In recent years, the Internet has led to an explosion of information and resources. The Internet, generally, is comprised of various web sites operated by network servers where the sites provide information or perform services for accessing users. Once a user accesses a web site, the site can collect, track, and sell personal information relating to the user. Thus, the Internet raises concerns for the privacy and well being of its users.

One such concern is for the safety of children who utilize the Internet. In order to minimize this concern, the Children's Online Privacy Protection Act (COPPA) was enacted in the United States of America and became effective on Apr. 21, 2000. COPPA applies to two groups of web site operators. First, COPPA applies to an operator of a commercial Web site or an online service directed to children under 13 that collects personal information from children. Second, COPPA applies to an operator of a general audience web site which has actual knowledge that it is collecting personal information from children.

COPPA establishes, inter alia, that certain web site operators take actions such as, for example, posting privacy policies, notifying parents of information practices, obtaining verifiable parental consent, and providing parents with access to children's information. Consequently, many web site operators have had to make their sites COPPA-compliant. However, one such difficulty that web site operators face is the time and cost of in fact becoming COPPA-compliant and maintaining compliance. Such difficulty has led many web site operators to completely block children from their web sites. Needless to say, such a solution is overly broad.

Therefore, a need exists for a method and system for obtaining and modifying parental consent for an operator of a web site, whereby a web site operator may easily and conveniently comply with COPPA.

SUMMARY OF THE INVENTION

The present invention satisfies the aforementioned need by providing a method and system for obtaining and modifying consent. A first party provides or denies consent for a second party to access a network server, where the network server requires such consent before allowing the second party access.

A user profile for the second party is created. The user profile for the second party has consent information regarding the network server. Consent information from the first party is received. The consent information provides or denies consent for the second party to access the network server. The received consent information is stored in the user profile of the second party.

The second party may then access the network server if the consent information stored in the user profile of the second party shows that the first party has provided consent. However, the second party may not access the network server if the consent information stored in the user profile of the second party shows that the first party has denied consent.

BRIEF DESCRIPTIONS OF THE DRAWINGS

The foregoing summary, as well as the following detailed description of various embodiments, is better understood when read in conjunction with the appended drawings. For the purpose of illustrating the present invention, there is shown in the drawings exemplary constructions of the present invention; however, the present invention is not limited to the specific methods and instrumentalities disclosed. In the drawings.

DETAILED DESCRIPTION OF THE INVENTION

In the present invention, consent information is obtained from a first party, where such information allows a second party access to a network server that requires such consent information to access the server. After initially obtaining the consent information, the obtained consent information is then stored in a user profile of the second party. The user profile is a collection of information that may include information such as, for example, the user's name, password, email address, personal preferences and/or various other information about the user. Once the consent information is stored in the user profile of the second party, the second party may then access the network server and network facilities such as sites operated in conjunction with the network server for which consent has been given. Importantly, only the first party can access and modify the consent information in the user profile of the second party.

In one embodiment of the present invention, the first party may modify the consent information through his/her own user profile. In this manner, a user profile of the first party is created and linked to the user profile of the second party and allows the first party to access and modify such consent information stored in the user profile of the second party via the user profile of the first party. In another embodiment, the first party may directly enter the user profile of the second party and modify such consent information.

In one embodiment of the present invention, the user profile of the second party is used to access an affiliate network server in conjunction with an authentication server. In this manner, the decision to allow or deny the second party access to an affiliate server is dependent on the consent information contained in the user profile of the second party.

The present invention is disclosed in terms of obtaining and modifying parental consent over the Internet by way of an affiliate server and authentication server for allowing a child to access a network server. Nevertheless, it should be appreciated that the consent may be present in other contexts such as, for example, employer-employee consent, spousal consent or the like without departing from the scope of the present invention. Moreover, such consent may be obtained through other networking environments such as, for example, a company's Intranet, a private networking environment, or the like without departing from the scope of the present invention.

Figure 1:
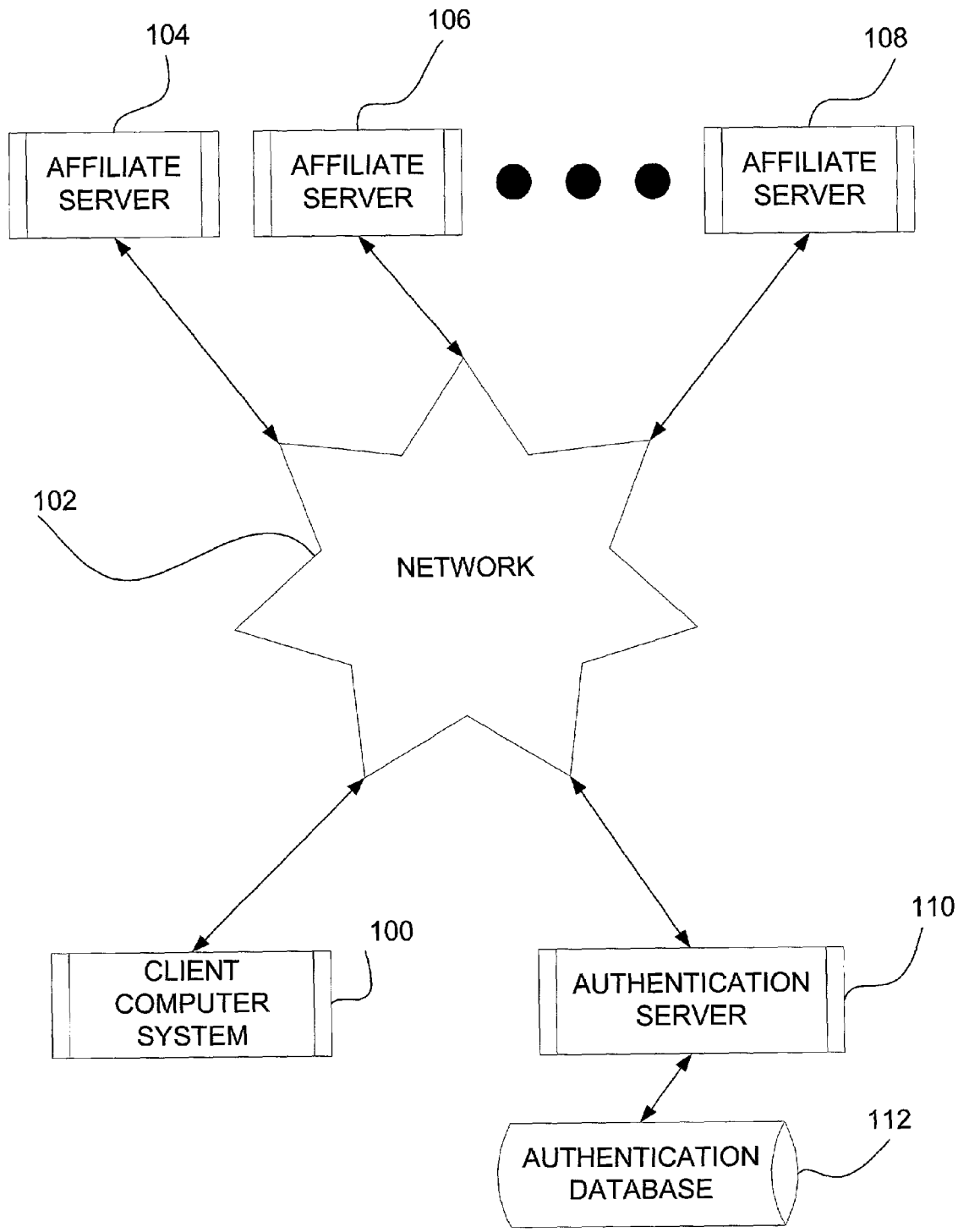
FIG. 1 is a block diagram of an exemplary networking environment in which aspects of the invention may be implemented.

FIG. 1 illustrates an exemplary network environment in which aspects of the present invention may be implemented. A client computer system 100 is coupled to a network 102. In this example, network 102 is the Internet. However, the teachings of the present invention can be applied to any data communication network. Multiple affiliate servers 104, 106, and 108 are coupled to network 102, thereby allowing client computer system 100 to access such servers 104, 106, and 108 via the network 102. Affiliate servers 104, 106, and 108 may also be referred to as "web servers" or "network servers". An authentication server 110 is also coupled to network 102, allowing communication between the authentication server 110 and client computer system 100 and web servers 104, 106, and 108. Although referred to as an "authentication server", authentication server 110 may also be a web server capable of interacting with client computer system 100 and web servers 104, 106, 108. In this example, data is communicated between the authentication server, client computer system, and web servers using the Hypertext Transfer Protocol (HTTP), which protocol is commonly used on the Internet to exchange information. Nevertheless, other protocols may be used without departing from the scope of the invention.

An authentication database 112 is coupled to authentication server 110. The authentication database 112 contains information necessary to authenticate users and also identifies which elements of the user profile information should be provided to a particular affiliate server 104, 106, 108 when the user accesses the affiliate server 104, 106, 108. Although the authentication database 112 is shown separately from the authentication server 110, in other embodiments of the invention, the authentication database 112 is contained within the authentication server 110.

The term "affiliate server" is defined herein as a web server that has "registered" or otherwise established a relationship or affiliation with the authentication server 110. Each affiliate server 104, 106, and 108 includes a code sequence (not shown) that allows the affiliate server to communicate with the authentication server 110 when a user (who is also registered with the authentication server) requests access to the affiliate server. Additional details regarding the authentication process and the interaction between the client computer, the affiliate servers, and the authentication server are provided below.

Prior to executing the authentication process described below, both the user of the client computer system 100 and the operator of the affiliate server 104 register with the authentication server 110. Registration is a one-time process that provides necessary information to the authentication server 110. The user of the client computer system 100 registers by providing information such as the user's name, mailing address, email address, and various other information about the user and/or the client computer system 100. As part of the user registration process, the user is assigned (or selects) a login ID, which is a common login ID used to access any affiliate server 104, 106, 108. The login ID may also be referred to herein as a "user name" or "login name". Additionally, the user selects a password associated with the login ID which is used for authentication purposes. After registering and logging into the authentication server 110, the user can visit any affiliate server 104, 106, 108 (i.e., affiliate servers that are also registered with the same authentication server 110) without requiring any additional authentication and without re-entering user information that is already contained in the user profile for the user.

The operator of affiliate server 104, 106, 108 registers with the authentication server 110 by providing information about the affiliate server 104, 106, 108 (e.g., server name and Internet address). Additionally, the affiliate server 104, 106, 108 provides information regarding its authentication requirements. The authentication requirements can be specified as the maximum time allowed since the last login and entry of authentication information by the user as well as the maximum time allowed since the last "refresh" of the authentication information by the user. Refreshing the authentication information refers to the process of having the user re-enter the password to be certain that the appropriate user is still operating the client computer system 100. This periodic refreshing of authentication information is useful if the user leaves the client computer system 100 without logging out of the authentication server 110, thereby perhaps allowing another individual to access affiliate servers 104, 106, 108 using the login ID of the previous user. If a user requests access to an affiliate server 104, 106, 108 after the maximum time allowed thereby, then the user is re-authenticated (i.e., refreshed) by the authentication server 110. Thus, although there is a central authentication server 110, each individual affiliate server 104, 106, 108 can establish its own authentication requirements which are enforced by the authentication server 110. After registering with the authentication server 110, the affiliate server 104, 106, 108 can use the authentication server 110 to authenticate any user that has also registered with the authentication server 110.

Figure 2:
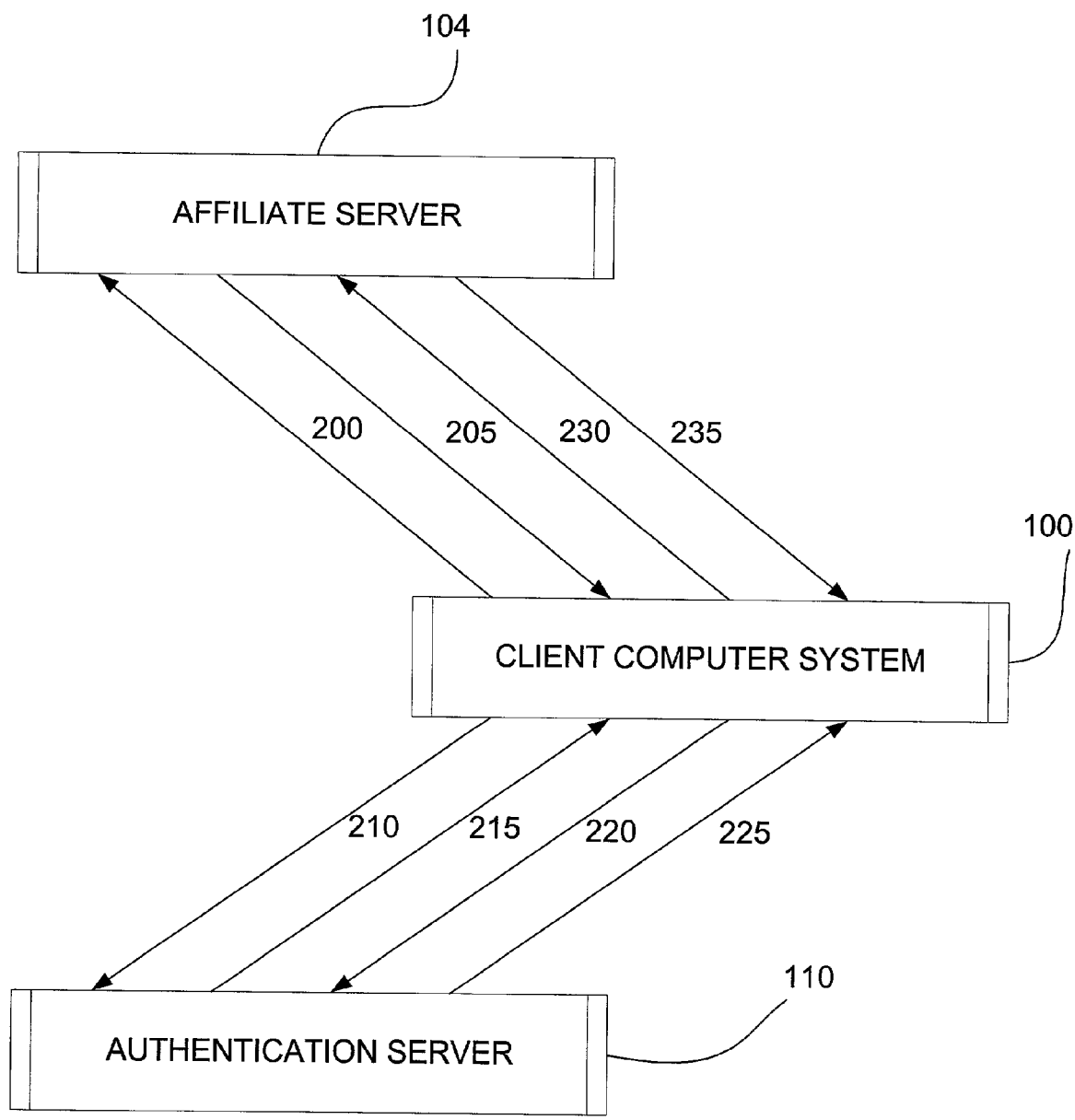
FIG. 2 is a flow diagram that illustrates in an exemplary manner the authentication process when a user of the client computer system seeks access to the affiliate server in which aspects of the present invention may be implemented.

FIG. 2 is a flow diagram that illustrates in an exemplary manner the authentication process when a user of the client computer system 100 seeks access to the affiliate server 104 in which aspects of the present invention may be implemented. The process begins when the user of the client computer system accesses a web page or the like on the affiliate server at step 200. The client computer system typically includes a web browser, such as the INTERNET EXPLORER web browser, a product of MICROSOFT Corporation of Redmond, Wash., for accessing various web sites. The affiliate server 104 determines whether the user seeking access to the server is already logged into the affiliate server 104 (e.g., authenticated). In this example, the user is not logged into the affiliate server 104, so the user must be authenticated before the affiliate server 104 will allow access. To authenticate the user, the affiliate server 104 redirects the user's browser to the authentication server 110 at step 205 and 210.

In this example, the user has not yet logged into the authentication server 110. Thus, the authentication server 110 generates a sign-in web page and communicates the web page to the client computer system 100 for display on the user's browser at step 215. The sign-in web page requests the user's login ID and password, which were established when the user registered with the authentication server 110. The user fills-in the requested information on the sign-in web page and clicks a "sign-in" button on the web page to send the information entered to the authentication server at step 220.

Upon receiving the information from the user of the client computer system 100, the authentication server 110 compares the entered information with the information stored in the authentication database 112 (FIG. 1). If the user-entered information is not correct (i.e., does not match the information stored in the authentication database 112) then the authentication server 110 generates and communicates a web page to the user indicating the login ID and password combination were not valid. The web page may give the user an opportunity to re-enter the login ID and password. Confidential information (such as the login ID and password) is communicated using a secure protocol such as SSL (secure sockets layer). Various other secure protocols or encryption mechanisms can be used to communicate confidential information between the authentication server 110 and the client computer system 100 without departing from the scope of the invention.

If the user-entered information is correct (i.e., matches the information stored in the authentication database 112) then the authentication server 110 transmits one or more appropriate cookies to the client computer system 100 and redirects the user's browser to the affiliate server at step 225.

As may be appreciated, a "cookie" is a piece of data provided to a web browser by a web server. The data (i.e., cookie) is sent back to the web server by the web browser during subsequent accesses to the web server. With respect to step 225, it may be the case that one cookie contains information regarding the date and time that the user was authenticated by the authentication server 110 and another cookie contains information regarding the user profile for the user. The authentication server 110 may also update or create a list cookie that contains a list of all sites (or web servers) visited by the user since the last logout from the authentication server 110. The cookie is updated by adding the current affiliate server 104 to the list of sites visited. Such list of sites visited as embodied within the list cookie may be used to remove cookies from the client computer system 100 when the user logs out of the authentication server 110. For example, when the user logs out, the authentication server 110 sends a message to each web server on the list of sites visited. Each message is a request for the web server to delete any cookies such web server placed on the client computer system 100 (e.g., through a browser running on the client computer system 100).

As may appreciated, cookies written to the client computer system 100 by the authentication server 110 cannot be read by any affiliate server 104, 106, 108. Similarly, cookies written to the client computer system 100 by a particular affiliate server 104 cannot be read by any other affiliate server 106, 108 or the authentication server 110. The cookies written by an affiliate server 104 are encrypted using a key that is unique to the affiliate server 104, thereby preventing other affiliate servers 106, 108 and the authentication server 110 from reading the data stored in such cookies.

The authentication server 110 also communicates the user profile information for the user to the affiliate server 104, 106, 108 at step 230 through the client computer system 100. The user of the client computer system 100 can specify during the registration process what types of profile information should be provided to various types of web servers. For example, a user may specify that all commerce-related web servers should receive the user's mailing address, but restrict the mailing address from all other types of web sites.

After receiving the user's profile information, the affiliate server 104 may generate a personalized web page for the user and communicate the generated web page to the user's browser at step 235. Additionally, the affiliate server 104 copies one or more cookies to the client computer system which include information confirming that the user of the client computer system has been authenticated and stating the period of time during which the authentication is valid. Each time the user enters a new web page request on the same affiliate server 104, the data in the cookie is copied to the affiliate server 104 along with the page request. Thus, the cookies vouch for the user at each page request and the affiliate server 104 need not repeatedly check the authentication of a user during each subsequent page request. However, if a particular period of time has passed (referred to as a timeout period) since the last authentication process by the authentication server 110, then the affiliate server 104 may request a re-authorization of the user. In this situation, the user is asked to refresh his/her authorization by re-entering a login ID and password. If the entered information is valid, then the timeout period is reset and the existing cookie(s) from the affiliate server 104 are replaced with new cookie(s) containing the new timeout information.

If the user of the client computer system 100 is new to the affiliate server 104, the affiliate server 104 may request additional user information that is not already contained in the user profile for the user. The additional information may include information unique to the affiliate server 104 (e.g., account number) or information about the user's preferences and how the user intends to use the affiliate server 104. Thus, although the user generates a user profile that is stored on the authentication server, the user may be required, during an initial visit to an affiliate server 104, to provide additional information for the benefit of the affiliate network server 104. The affiliate server 104 then stores such additional information such that the user need not be required to re-enter the data during subsequent visits to the same affiliate server 104.

Turning now to the present invention, when a child attempts to access an affiliate server 104, the child and the affiliate server go through a series of steps as outlined above in connection with FIG. 2. However, and importantly, at some point the affiliate server 104 and/or the authentication server 110 determine that the child is in fact a child within the scope of COPPA and therefore parental consent for the child must be obtained.

Accordingly, and in one embodiment of the present invention, prior to providing access to the affiliate server 104, the authentication server 110 obtains parental consent for the child to access the affiliate server 104.

Figure 3:
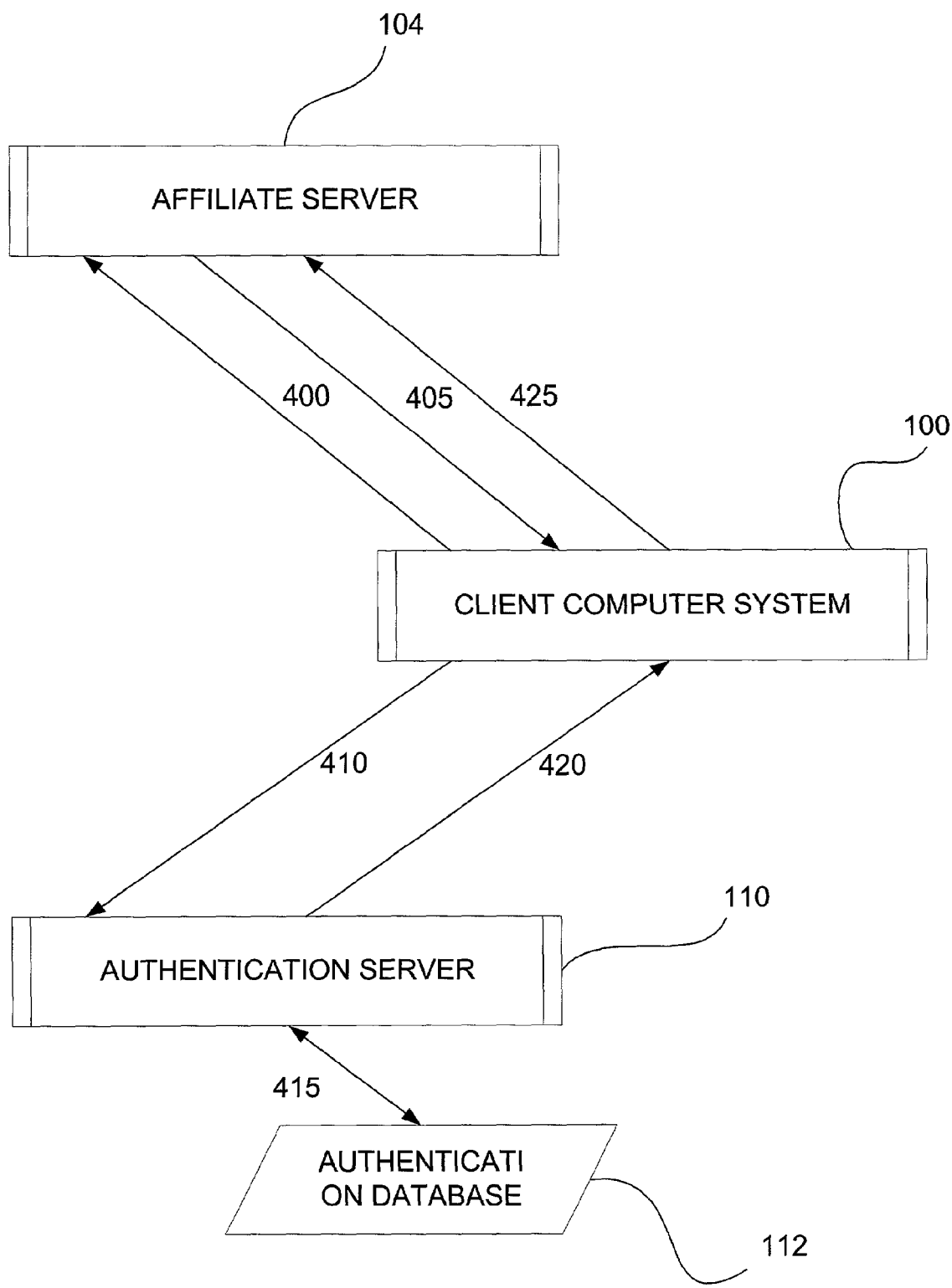
FIG. 3 is a flowchart illustrating a method of obtaining consent in accordance with the present invention.

More specifically, and turning now to FIG. 3 the interaction between the child at a client computer system 100, an affiliate server 104 and an authentication server 110. As shown, such child is seeking access to the affiliate server 104 that requires parental consent to access such affiliate server 104.

As shown, the child accesses content of the affiliate server 104 at step 400. Typically, this is accomplished by typing in the affiliate server's URL or clicking on a hyperlink to such URL. In the manner as discussed above in connection with FIG. 2, the affiliate server redirects the web browser of the child's computer system 100 to the authentication server 110 at steps 405 and 410. Assuming the child has not yet logged into the authentication server 110, the authentication server 110 generates a sign-in web page and communicates the web page to the client computer system 100 for display on the child's browser at step 415. The child fills-in the requested information on the sign-in web page and clicks a "sign-in" button on the web page to send the information entered to the authentication server at step 420.

Upon receiving the information from the child, and upon confirming the validity of information, the authentication server 104 notes that the child is in fact a child. The authentication server 104 may make such determination in any appropriate manner without departing from the scope of the present invention. For example, the authentication server may use the child's birthday to determine if the child is in fact a child according COPPA or some other predetermined criteria.

The authentication server 110 then searches in the user profile of the child in the authentication database to determine whether such user profile contains consent information which permits the child to access such affiliate server 104. If the user profile of the child contains consent information providing consent for the child to access such affiliate server, then authentication server 110 directs the child's browser back to the affiliate server 104 at steps 420 and 425. The affiliate server 104 then grants access, to the extent of such consent information, to the child.

However, if the user profile of the child contains consent information that denies access to such affiliate server 104, the authentication server 110 again directs the child's browser to the affiliate server at steps 420 and 425. However, the affiliate server 104 denies access to the child and in one embodiment of the present invention, the affiliate server 104 or the authentication server 110 may communicate to the child that the child does not have consent to access such affiliate server 104.

Additionally, the authentication server 110 may not find any consent information at the authentication database 112 in the user profile of the child relating to such affiliate server 104. In this case, the affiliate server 104 or the authentication server 104 may communicate to the child that consent is needed to access such affiliate server 104 and the child must notify the parent to provide consent to the user profile of the child in order for the child to access such affiliate server 104.

In one embodiment of the present invention, the consent information is in the form of different levels of consent. For example, the consent information in the user profile of the child may grant the child access to a particular affiliate server 104. However, such consent information may restrict access to certain portions of such affiliate server 104. Other levels of consent may be used, such as, for example, consent restricting access to the affiliate server 104 at certain times, without departing from the scope of the present invention.

Figure 4:
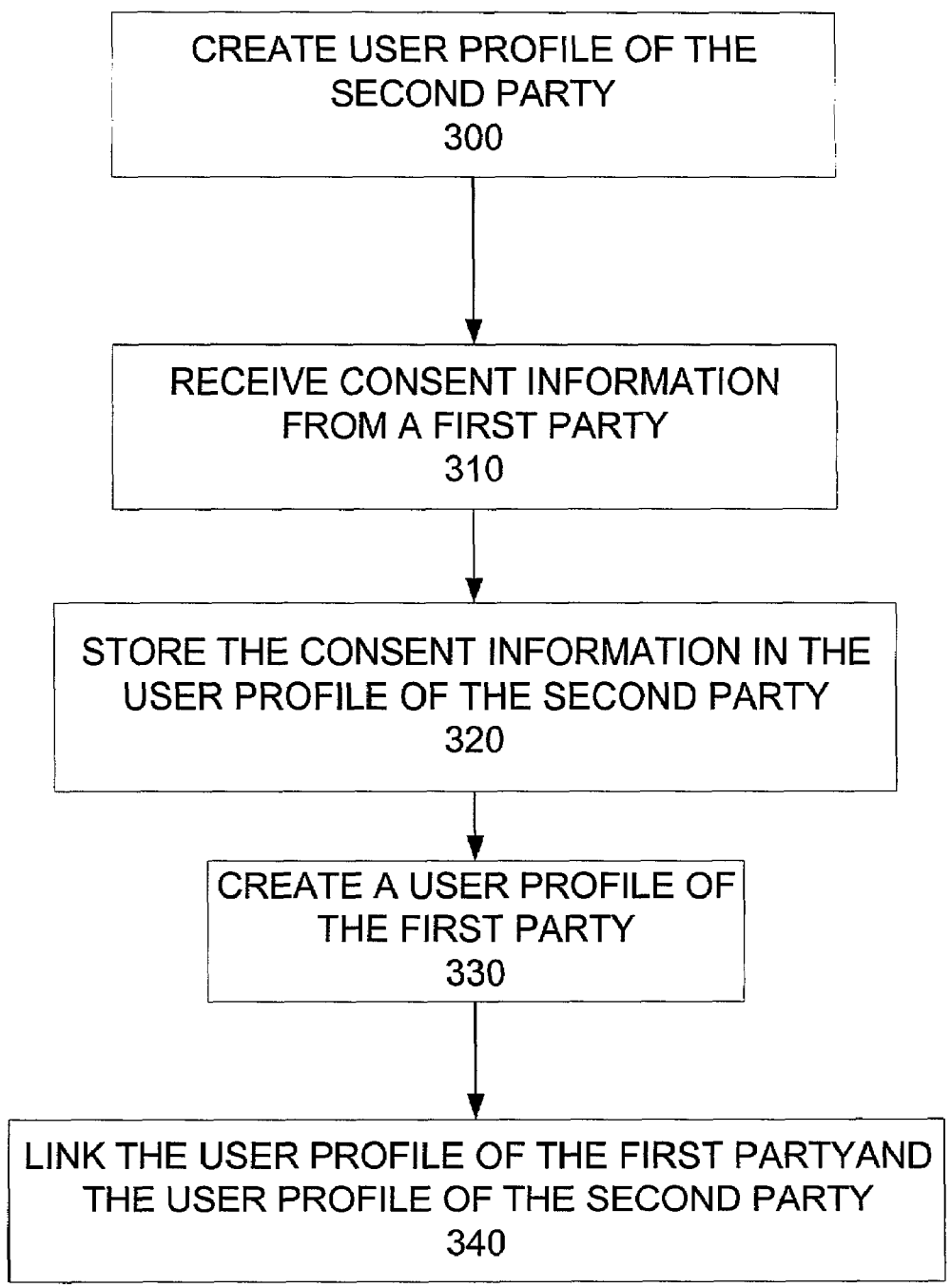
FIG. 4 is a block diagram that illustrates in an exemplary manner the interaction between a child using a user profile containing consent information in accordance with the present invention, an affiliate server and an authentication server.

Referring now to FIG. 4, steps implemented by the authentication server 104 of FIG. 3 are shown. At some point, a user profile is created for the child at the authentication server 110. The user profile of the child can be created prior to or as part of the present process. Such user profile contains information such as the name, address, age, user name, password and other information of the child. Either the child or the parent may create the user profile of the child. Furthermore, age information may already be included in the user profile of the child or may have to be added as part of the present process. For example, the child may have a user profile but never accessed an affiliate server that requires age information, such as for example, those servers that fall outside the scope of COPPA. Therefore, when a child attempts to access an affiliate server that is within the scope of COPPA, either the authentication server 110 or an affiliate server 104, 106, 108 must retrieve such age information from the child.

Regardless of who creates the user profile and when, the parent at some point must provide consent information with regard to the affiliate server to be stored in the user profile of the child. It should be appreciated that the parent can be given the opportunity to provide the consent information in various manners. For example, the child can immediately get the parent, the authentication server can notify the parent by way of email, or the like, without departing from the scope of the present invention.

After being prompted to supply the consent information, the parent supplies such consent information to the authentication server 104 and the authentication server, at step 310, receives such consent information. As may be appreciated, the consent information from the parent provides or denies the child access to the affiliate server. In one embodiment of the present invention, the parent is provided with a list of affiliate servers 104 that the adult may choose to provide or deny consent for the child to access. At any rate, after receiving such consent information from the parent, the consent information is then stored in the user profile of the child as at step 320. Consequently the child may access affiliate servers 104 to which the parent has in fact consent provided consent and may not access those affiliate servers 104 to which the parent has in fact denied consent.

In one embodiment of the present invention, at step 330, the parent and authentication server 110 in combination create a user profile of the parent with appropriate user information. It may be appreciated that the user profile of the parent may be created before the user profile of the child is created. In this manner, once the user profile of the parent is created, the parent can subsequently provide consent in accordance with the present invention. Thereafter, the authentication server 104 links the user profile of the parent and the user profile of the child in an appropriate manner at step 340.

Once linked, the parent, by way of the user profile of the parent, may access and modify any previously given consent information in the user profile of the child. In this manner, the authentication server 104 can receive modified consent information from the parent. The authentication server may replace the previous consent information in the user profile of the child with the modified consent information. The child may then access affiliate servers 104, 106, 108 in accordance with the modified consent information in the user profile thereof.

In one embodiment of the present invention, once linked, only the parent by way of the user profile of the parent can modify the consent information in the user profile of the child. Such a limitation and the aforementioned link may, for example, be achieved by placing in the user profile of the parent a pointer to the user profile of the child and/or by placing in the user profile of the child a pointer to the user profile of the parent.

Figure 5:
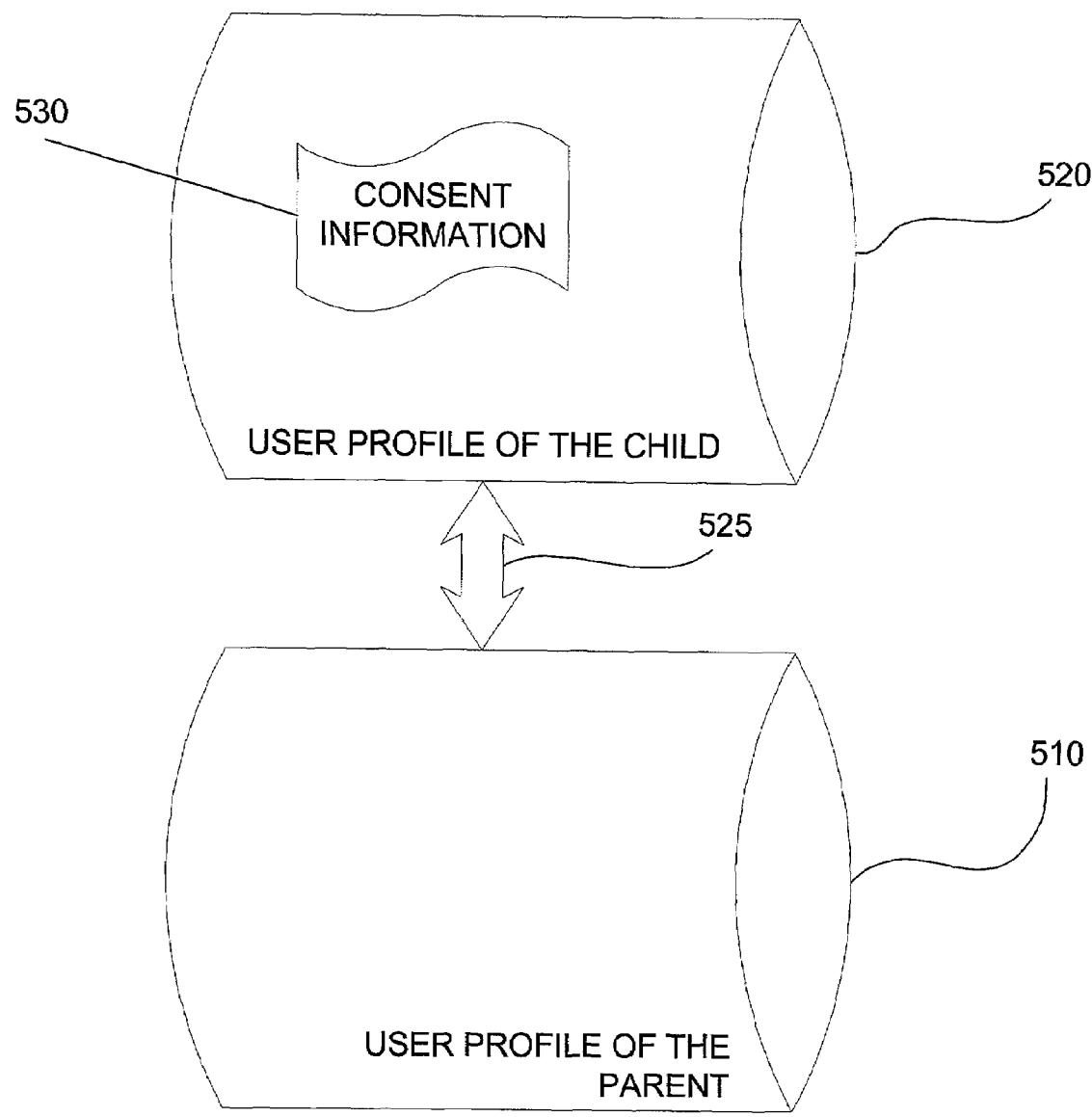
FIG. 5 is a block diagram illustrating two exemplary user profiles linked together in accordance with the present invention.

In particular and referring now to FIG. 5, a user profile 510 of the child and a user profile 520 of the parent are shown. Profiles 510, 520 are connected by the aforementioned link demonstratively shown as element 525.

As may be appreciated, the link 525 may be employed to allow the parent and the child to communicate using the user profiles 510, 520. For example, the child may request consent to access an affiliate server 104 from the parent via the user profiles 510, 520 if the parent has not already given such consent to access. Then, the parent may provide or deny consent again via the profiles 510, 520.through the user profile of the first party.

As shown, the consent information 530 for the child is in the user profile of the child 520. It should be appreciated that the consent information 530 may be in the user profile 510 of the parent or both profiles 510, 520 without departing from the scope of the present invention.

In one embodiment of the present invention, the user profile of the first party may be linked to multiple user profiles of multiple second party. Also, the user profile of the second party may be linked to multiple user profiles of multiple first party. For example, the user profile of a child may be linked to a user profile of the child's father and the user profile of the child's mother. Conversely, the user profile of the mother may be linked to the user profile of the mother's first child as well as the user profile of the mother's second child.

Before a parent is allowed to provide consent information for a child, the parent should be verified as an adult. Adult verification assures that the parent is of proper age to provide consent information. One method of verifying the parent as an adult is through a credit card check. In this manner, the authentication server 104 requests the parent enter a credit card number. Then, the authentication server 104 checks whether the parent entered a valid credit card number. If so, the authentication server 104 allows the parent to proceed in the process of providing consent information for a child. If not, the authentication server 104 will not allow the parent to proceed. Additionally, the parent need only be verified as an adult once, such that, once verified, the adult may provide modified or additional consent without going through the adult verification process again.

As should now be understood, in the present invention, consent for a second party is obtained from a first party and stored as consent information 530 in a user profile 510, 520 for one party or both of the parties. Changes could be made to the embodiments disclosed above without departing from the broad inventive concepts thereof. For example, the invention could be practiced on a single server rather than an authentication server 110 and an affiliate server 104. It is understood, therefore, that this invention is not limited to the particular embodiments disclosed, but it is intended to cover modifications within the spirit and scope of the present invention as defined by the appended claims.

What is claimed is:

1. A method of allowing a first party to provide or deny consent for a second party to access a network server that requires such consent prior to allowing the second party access thereto, the method comprising:

creating a user profile for the second party, the user profile for the second party including consent information regarding second party access to the network server, wherein the consent information is information directed to an age of the first party or content of the network server;

receiving the consent information from the first party, the consent information providing or denying consent for the second party to access the network server, wherein the first and the second parties are individuals and potential accessors of the network server; and storing the consent information in the user profile of the second party;

wherein the second party is allowed to access the network server if the consent information stored in the user profile of the second party shows that the first party individual has provided consent and wherein the second party is not allowed to access the network server if the consent information stored in the user profile of the second party shows that the first party individual has denied consent, and further wherein, prior to the first party providing consent information for the network server, the network server must register with an authentication server, providing authentication requirements to be used by the authentication server to determine whether to allow access to the network server when the first party or the second party request access to the network server.

2. The method of claim 1 wherein the network server is an Internet network server.

3. The method of claim 1 wherein the consent information in the user profile of the second party is first consent information, the method further comprising:

receiving modified consent information from the first party, the modified consent information providing or denying consent for the second party to access the network server; and replacing the first consent information in the user profile of the second party with the modified consent information, wherein the second party is allowed to access the network server if the modified consent information stored in the user profile of the second party shows that the first party has provided consent and wherein the second party is not allowed to access the network server if the modified consent information stored in the user profile of the second party shows that the first party has denied consent.

4. The method of claim 1, wherein the first party is an adult and the second party is a child.

5. The method of claim 1 wherein the network server is a first network server and the consent information is first consent information, the method further comprising:

detecting an attempt by the second party to access a second network server, the second network server not having any corresponding consent information in the user profile of the second party providing or denying consent for the second party to access the second network server;

notifying the first party that the second party wishes to be provided with consent for the second party to access the second network server;

receiving second consent information from the first party, the second consent information providing or denying consent for the second party to access the second network server; and storing the second consent information in the user profile of the second party; wherein the second party is allowed to access the second network server if the second consent information stored in the user profile of the second party shows that the first party has provided consent and wherein the second party is not allowed to access the second network server if the second consent information stored in the user profile of the second party shows that the first party has denied consent.

6. The method of claim 5 further including the step, prior to notifying the first party that the second party wishes to be provided with consent to access the second network server, of verifying through user profile information that the second party is a child.

7. The method of claim 1, for allowing a first party to provide a level of consent for a second party to access a network server, the method comprising:

receiving level of consent information from the first party, the level of consent information specifying the level of consent for the second party to access the network server; and storing the level of consent information in the user profile of the second party;

wherein the second party is allowed to access the network server in accordance with the level of consent information stored in the user profile of the second party.

8. The method of claim 1 wherein the consent information affirmatively allows or denies access to the network server by the second party, without providing a variable level of consent.

9. The method of claim 1 wherein the consent information includes either an allowance or denial of access to each of multiple Internet network servers.

10. The method of claim 9 wherein, prior to the first party providing consent information for each of multiple network servers, each of the multiple network servers must register with an authentication server, each providing authentication requirements to be used by the authentication server to determine whether to allow access to a respective network server when the first party or the second party request access to the respective network server.

11. The method of claim 1 wherein the consent information includes restrictions to certain portions of the network server based upon content of subject matter provided by the network server or time of requested access to the network server by the second party.

12. The method of claim 1, wherein the consent information for the second party is stored in the user profile of the first party rather than in the user profile of the second party.

13. The method of claim 1 further comprising:
creating a user profile for the first party individual prior to creating a user profile for the second party; and
linking the user profile for the first party and the user profile for the second party wherein the consent information providing or denying consent for the second party to access the network server is only received by input from the first party by way of the user profile of the first party.

14. The method of claim 1 wherein the authentication requirements comprise at least one of: a maximum time allowed since the first party or second party entered authentication information to the authentication server by logging in to the authentication server, and a maximum time allowed since the first party or second party reentered a password without logging out of the authentication server;
and wherein the authentication server requires the first party or second party to reenter authentication information to the authentication server by logging in again to the authentication server, or to reenter the password to the authentication server, respectively, after the respective maximum time allowed has elapsed, in order for the first party or second party to continue to be granted access to the network server.

15. A computer readable medium having computer-executable instructions thereon for allowing a first party to provide or deny consent for a second party to access each of multiple network servers that each require such consent prior to allowing the second party access thereto, the instructions, when executed by a processor, cause the processor to perform:
creating a user profile for the second party, the user profile for the second party including verification that the second party is a child and including consent information regarding second party access to each of the network servers, wherein the consent information is directed to access, or partial access, to each of the network servers based upon a content of subject matter included thereon;
receiving the consent information from the first party, the consent information providing or denying consent for the second party to access each of the network servers, wherein the first and the second parties are individuals and potential or actual accessors of the network server; and
storing the consent information in the user profile of the second party;
wherein the second party is allowed to access a respective network server if the consent information stored in the user profile of the second party shows that the first party individual has provided consent and wherein the second party is not allowed to access the network server if the consent information stored in the user profile of the second party shows that the first party individual has denied consent, and
further wherein, prior to the first party providing consent information for the network server, the network server must register with an authentication server, providing authentication requirements to be used by the authentication server to determine whether to allow access to the network server when the first party or the second party request access to the network server.

16. The computer readable medium of claim 15, wherein receiving the consent information from the first party comprises receiving the consent information only by way of the user profile of the first party.

17. The computer readable medium of claim 15, wherein the consent information in the user profile of the second party is first consent information, the computer-executable instructions further causing the processor to perform:
receiving modified consent information from the first party, the modified consent information providing or denying consent for the second party to access the network server; and
replacing the first consent information in the user profile of the second party with the modified consent information;
wherein the second party is allowed to access the network server if the modified consent information stored in the user profile of the second party shows that the first party has provided consent and wherein the second party is not allowed to access the network server if the modified consent information stored in the user profile of the second party shows that the first party has denied consent.

18. The computer readable medium of claim 15, wherein the first party is an adult and the second party is a child.

19. The computer readable medium of claim 15, wherein the network server is a first network server and the consent information is first consent information, the computer-executable instructions further causing the processor to perform:
detecting an attempt by the second party to access a second network server, the second network server not having any corresponding consent information in the user profile of the second party providing or denying consent for the second party to access the second network server;
notifying the first party that the second wishes to be provided with consent for the second for the second party to access the second network server;
receiving second consent information from the first party, the second consent information providing or denying consent for the second party to access the second network server; and
storing the second consent information in the user profile of the second party;
wherein the second party is allowed to access the second network server if the second consent information stored in the user profile of the second party shows that the first party has provided consent and wherein the second party is not allowed to access the second network server if the second consent information stored in the user profile of the second party shows that the first party has denied consent.

20. The computer readable medium of claim 15, for allowing a first party to provide a level of consent for a second party to access a network server, the computer-executable instructions further causing the processor to perform:
receiving level of consent information from the first party, the level of consent information specifying the level of consent for the second party to access the network server; and
storing the level of consent information in the user profile of the second party;
wherein the second party is allowed to access the network server in accordance with the level of consent information stored in the user profile of the second party.

21. The computer-readable medium of claim 15, the computer-executable instructions further causing the processor to perform:
creating a user profile for the first party individual prior to creating a user profile for the second party, the user profile for the first party including verification that the first party individual is an adult; and linking the user profile for the first party and the user profile of the second party wherein the consent information providing or denying consent for the second party to access a respective network server is only received from the first party by way of the user profile of the first party.

22. The computer-readable medium of claim 15, wherein the authentication requirements comprise at least one of: a maximum time allowed since the first party or second party entered authentication information to the authentication server by logging in to the authentication server, and a maximum time allowed since the first party or second party reentered a password without logging out of the authentication server;

and wherein the authentication server requires the first party or second party to reenter authentication information to the authentication server by logging in again to the authentication server, or to reenter the password to the authentication server, respectively, after the respective maximum time allowed has elapsed, in order for the first party or second party to continue to be granted access to the network server.

23. A method of allowing a first party to provide or deny consent for a second party to access each of multiple network servers that require such consent prior to allowing the second party access thereto, wherein the first party is an adult and the second party is a child, the method comprising:

creating a user profile for the second party, the user profile for the second party including consent information regarding second party access to the multiple network servers, wherein the consent information is information directed to an age of the first party or respective content of the multiple network servers;

receiving the consent information from the first party, the consent information providing or denying consent for the second party to access each of the network servers, wherein the first and the second parties are individuals and potential accessors of the multiple network servers;

receiving level of consent information from the first party, the level of consent information specifying the level of consent for the second party to access each of the multiple network servers;

storing the consent information in the user profile of the second party;

storing the level of consent information in the user profile of the second party;

wherein the consent information in the user profile of the second party is first consent information and when modified consent information is received from the first party, the modified consent information providing or denying consent for the second party to access at least one of the multiple network servers, the method further comprises:

replacing the first consent information in the user profile of the second party with the modified consent information, wherein only the first party can modify the consent information in the user profile of the second party, wherein when an attempt by the second party to access a second network server is detected, the second network server not having any corresponding consent information in the user profile of the second party providing or denying consent for the second party to access the second network server, the method further comprises:

notifying the first party that the second party wishes to be provided with consent for the second party to access the second network server;

receiving second consent information from the first party, the second consent information providing or denying consent for the second party to access the second network server; and storing the second consent information in the user profile of the second party, wherein the second party is allowed to access a particular one of the multiple network servers if the consent information stored in the user profile of the second party shows that the first party individual has provided consent for that particular network server, and wherein the second party is not allowed to access the particular network server if the consent information stored in the user profile of the second party shows that the first party individual has denied consent for that particular network server, and wherein the second party is allowed to access the particular network server in accordance with the level of consent information stored in the user profile of the second party, wherein, prior to the first party providing consent information for the network server, the network servers register respective authentication requirements with an authentication server, the authentication requirements for a particular network server to be used by the authentication server to determine whether to allow access to a particular network server when the first party or the second party request access to the particular network server, wherein the first party or the second party must comply with the authentication requirements in order to be granted access to the particular network server by the authentication server, wherein the authentication requirements comprise at least one of: a maximum time allowed since the first party or second party entered authentication information to the authentication server by logging in to the authentication server, and a maximum time allowed since the first party or second party reentered a password without logging out of the authentication server;

and wherein the authentication server requires the first party or second party to reenter authentication information to the authentication server by logging in again to the authentication server, or to reenter the password to the authentication server, respectively, after the respective maximum time allowed has elapsed, in order for the first party or second party to continue to be granted access to the network server.

* * * * *